United States Patent
Dickopp et al.

(10) Patent No.: US 6,272,258 B1
(45) Date of Patent: Aug. 7, 2001

(54) METHOD FOR FRACTAL CODING OF VIDEO OR AUDIO SIGNALS

(75) Inventors: Gerhard Dickopp, Krefeld; Thomas Vaupel, Essen, both of (DE)

(73) Assignee: Deutsche Thomson-Brandt GmbH (DE)

( * ) Notice: Subject to any disclaimer, the term of this patent is extended or adjusted under 35 U.S.C. 154(b) by 0 days.

(21) Appl. No.: 09/215,486

(22) Filed: Dec. 18, 1998

(30) Foreign Application Priority Data

Dec. 20, 1997 (DE) ................................. 197 57 045

(51) Int. Cl.$^7$ ................................. G06K 9/36; G06K 9/46
(52) U.S. Cl. ................................. 382/249
(58) Field of Search ................................. 382/247, 248, 382/249, 250, 253; 702/90; 348/420.1; 375/240.24, 240.18; 358/433; 345/436

(56) References Cited

U.S. PATENT DOCUMENTS 5,347,600 * 9/1994 Barnsley et al. ................... 382/249
5,924,053 * 7/1999 Horowitz et al. ................... 702/90

OTHER PUBLICATIONS

O.C. Au, M.L. Liou & L.K. Ma; "Fast Fractal Encoding in Frequency Domain"; IEEE, Image Processing 1997, Proceedings; International Conference; pp. 298–301; vol. 2, Jul. 1997.*

Yuval Fisher; "Fractal Image Processing Theory and Application"; Springer–Verlag, N.Y. 1995, pp. 91–117, Nov. 1994.*

* cited by examiner

Primary Examiner—Timothy M. Johnson
(74) Attorney, Agent, or Firm—Joseph S. Tripoli; Joseph J. Laks; Ronald H. Kurdyla

(57) ABSTRACT

In a method for fractal coding of signals, in which a domain block d is investigated for a range block r to be transmitted from an original signal, so that, after using the calculation rule $r^* = v \cdot d + b$, an approximated range block $r^*$ is generated, $v \cdot d$ being a linear function and b being an offset vector, the offset vector b in general has different components $b=(b_1, b_2, \ldots, b_n)$ the offset vector b preferably being composed of weighted orthogonal basic functions of an orthogonal transformation.

7 Claims, 2 Drawing Sheets

METHOD FOR FRACTAL CODING OF VIDEO OR AUDIO SIGNALS

BACKGROUND OF THE INVENTION

The invention relates to a method for fractal coding of signals, in particular of video or audio signals.

The so-called self-similarity of a signal to be transmitted is used for fractal coding of, for example, images, the principles of which are described in the article by Jaquin, A. E.: "Image Coding Based on a Fractal Theory of iterated Contractive Image Transformations", IEEE Transactions on Image Processing, Vol. 1, No. 1, January 1992. If the signal to be transmitted is a video signal, use is then made of the fact that parts of the image can be represented by other image parts which are geometrically located at different points in the same image, if these image parts are changed in a specific manner. If the signal to be transmitted is an audio signal, then a corresponding situation applies in that specific sections of the audio signal can be modelled by other signal sections, when these signal sections are manipulated in a specific manner.

The procedure in this case is to investigate a so-called domain block d to form a signal section which is intended to be transmitted, the normally so-called range block r, from which domain block d an approximated range block r* is formed by using a specific calculation rule and which models the range block r as well as possible. The calculation rule used in this case is:

$$r^* = v \cdot d + b \text{ where } b^T = (b, b \ldots b) \qquad (1)$$

In this case, $v \cdot d$ is a linear map and the term b describes an offset, to be precise in general of such a type that the components in general experience different "shifts" by $v \cdot d$. For data reduction reasons, the document by Jaquin quoted above proposes that an offset vector comprising identical components be selected for the offset:

$$b = (b, b \ldots b)^T \qquad (2)$$

where $b^T$ is the transpose of the vector b.

The domain block vector d used in equation (1) is in this case normally obtained from the original signal by cutting out of the original signal a signal block whose dimensions are larger than those of the range block vector r to be modelled. This larger signal block is then normally subjected to geometric transformation (mirroring, rotation or the like) and is then reduced in size by a further operation (undersampling and filtering or the like) to the dimensions of the range block vector r.

A search method is used to determine the domain block d which best models the signal section to be transmitted. In this case, the mean square error according to equation (3) is in general used as the decision criterion for the quality of the modelling.

$$e^2 = 1/N \sum_{i=1}^{N} (r_i - r_i^*)^2 \qquad (3)$$

where:

$e^2$ mean square error $r_i$ i-th element of the range block vector r, which is composed of N components, and $r^*_i$ i-t element of the approximated range block vector r*.

Apart from the position of the domain block in the original signal, the search method used also has the object of determining what the optimum parameters are for the gain v and the offset b and what geometric transformation should, if necessary, be applied to the signal block.

The fractal code for the signal block to be transmitted now comprises the optimum parameters that have been found: position of the domain block in the signal, geometric operation applied to this domain block, gain v and offset b. These parameters are coded and transmitted.

In the receiver, apart from an error which may be relatively large or relatively small depending on the quality of the coding, the signal section can be reconstructed by applying the mapping rule a plurality of times to any desired initial signal. That is to say, in the first step, each approximated range block is produced by applying the rule (4) to the corresponding domain block from the random initial signal, once the domain block has been reduced in size and has been subjected to the correspondingly associated geometric operation on this range block.

$$r^*_1 = v \cdot d_0 + b \qquad (4)$$

$d_0$ domain block in the initial signal $r^*_1$ first approximation range block If the mapping rule is applied to all the range blocks, then a first approximation to the original signal is obtained by joining together the approximated range blocks from the random initial signal.

In the second step, each approximated range block is produced by applying the rule (5) to the corresponding domain block from the first approximation, once again after the domain block has been reduced in size and has been subjected to be correspondingly associated geometric operation on this range block.

$$r^*_2 = v \cdot d_1 + b \qquad (5)$$

where:

$d_1$ first approximation range block, and $r^*_2$ : second approximation range block.

A second approximation to the original signal is this obtained.

This procedure is now repeated as often as is necessary to obtain a good reconstruction of the original signal. As a rule, this involves 10 to 20 iterations for original images.

Investigations into fractal coding of audio signals using equation (1) have shown that, with the assumption according to equation (2), sufficiently good models of the range blocks can in general be achieved only if very small range blocks are chosen. However, small range blocks mean little data reduction. A more favourable solution in terms of data reduction is obtained using unequal values for the component so the offset vector, and large range blocks.

Furthermore, the use of fractal coding in image coding can lead, in the case of certain images with periodic structures close to one another, to the structures not being reproduced with few errors.

If fractal coding is used for audio coding, then periodic signals likewise lead to the result that these signals can be reproduced only very inadequately using the method. This is a result of the fact that fractal coding always involves a reduction in the size of the domain blocks. In the case of periodic signals, this reduction in size leads to the signal period being varied by the compression that is used. If the signal passage which contains the domain blocks does not include any signal elements which, as a result of the compression, lead to a signal whose period is similar to the range blocks, then the corresponding range blocks can be reproduced only very inadequately.

SUMMARY OF THE INVENTION

The invention is thus based on the object of providing a method for fractal signal coding for video or audio signals, which allows a higher degree of data reduction and better reproduction of periodic structures.

The object is achieved by the subject matter of claim 1. Preferred refinements of the invention are the subject matter of the dependent claims.

According to the invention, favourable offset vectors b are used for fractal coding, the offset vector b being formed from weighted orthogonal basic functions of an orthogonal transformation. More favourable offset vectors b can be found by analyzing the blocks to be modelled and being modelled spectrally with the aid of a suitably selected transformation, for example discrete cosine transformation (DCT), and by using the results to represent the offset vector b by the sum of a number of less-weighted basic vectors of the selected transformation. The method is not limited to the use of DCT transformation and it is possible to use other orthogonal transformations, such as discrete Fourier transformation DFT, which is likewise used in audio coding.

The orthogonal basic vectors can advantageously be used to reproduce periodic signal elements. Furthermore, one advantage of the method according to the invention is that the signal reconstruction at the reproduction end can be carried out in a familiar manner using the conventional iteration process (that is to say without increasing the complexity).

Block windowing using windows with soft boundaries represents an additional advantageous method for fractal coding, which has been found to be particularly advantageous for avoiding so-called blocking effects in the coding of audio signals. Such blocking effects are caused by sudden changes in value at the block boundaries in the reproduced signal.

A detailed description of the method according to the invention is given in the following text.

Conventional use of fractal coding involves using a domain block to model a range block, with the aid of equation (1). The offset b which is used in this equation and is constant over the entire block area there is now replaced, according to the invention and as is shown in the following equation (6), by a vector b with different components.

$$r^* = v \cdot d + b; \quad b = (b_1, b_2, \ldots b_N) \qquad (6)$$

where:

r*: model of the range block r, d: domain block (if necessary using a geometric operation), v: gain, b: offset vector, which is obtained from weighted orthogonal basic functions.

This vector b is intended to be composed of weighted orthogonal basic functions, according to the following equation (7). The orthogonal basic functions used in the method described here may be, for example, the basic functions of the cosine transformation. The decision on which basic functions and how many basic functions are used must be made depending on the application and has no influence on the fundamental procedure described here. The vector components $b_i$ of the vector b can thus be described by the equation (7).

$$b_i = \sum_{m=1}^{M} a_m t_{i,m} \qquad (7)$$

where:

$b_i$: i-th element of the vector b with N values, $t_{i,m}$: i-th element of the basic vector $t_m$ with N values, $a_m$: weighting factor of the m-th basic vector $t_m$.

In this case, equation (7) uses the first M basic vectors with a rising frequency index of an orthogonal transformation. This selection is purely arbitrary and is intended to be used only as an example. It is also assumed that the range block vector r comprises N elements and that the basic vectors $t_m$ used are basic vectors of an orthogonal transformation, which requires just N basic vectors for complete representation of an original vector having N elements.

The mean square error according to equation (3) is used to search for the optimum domain block. Minimizing the mean square error for a given range block vector r and a given domain block vector d allows the optimum values for the gain v and the coefficients $a_m$ of the orthogonal basic vector $t_m$ to be quoted as:

$$v = \sum_{i=1}^{N} R_i^* \cdot D_i^* \Big/ \sum_{i=1}^{N} (D_i^*)^2 \qquad (8)$$

where:

$$R_i^* = \sum_{k=M+1}^{N} R_k \cdot t_{k,i} \qquad (10)$$

$$R_k = \sum_{i=1}^{N} r_i \cdot t_{k,i} \text{ or } R_m = \sum_{i=1}^{N} r_i \cdot t_{m,i} \qquad (11)$$

$$D_i^* = \sum_{k=M+1}^{N} D_k \cdot t_{k,i} \qquad (12)$$

$$D_k = \sum_{i=1}^{N} d_i \cdot t_{k,i} \text{ or } D_m = \sum_{i=1}^{N} d_i \cdot t_{m,i}. \qquad (13)$$

In this case, $R_k$ and $D_k$ according to (11) and (13) are the respective vector product, of the range block vector $r^T$ of the domain block vector d and of the basic vector $t_k$, that is to say the k-th spectral coefficient when the transformation which can be assigned to the basic vectors is applied to the range block vector r and to the domain block vector d, respectively.

$R_i^*$ and $D_i^*$ are the i-th elements of the vectors which are obtained if only the spectral coefficients M+1 to N are used to reproduce the range block vector r and the domain block vector d, respectively.

This means that the gain v is calculated according to equation (8) using only the remaining elements of the range block vector r and the domain block vector d. The remaining elements contain only spectral components which are not included in the vector b. In the present example, the vector b contains the spectral components with the frequency indices 0 to M according to equation (7), and the remaining elements contain only the spectral components M+1 to N.

The m-th coefficient $a_m$ of the vector b is obtained according to equation (8) with the aid of the corresponding spectral coefficients $R_m$ of the range block and $D_m$ of the domain block with the aid of the gain v.

The relationships quoted above make it clear that the described method produces a link between the transformation coding and the fractal coding. The derivations of equations (8) and (9) are contained in Annex 1.

Annex 2 contains an example of a one-dimensional DCT transformation.

The following text explains an extension of the method according to the invention explained above, using a window function with soft boundaries.

The present use of fractal coding results in range and domain blocks being produced by the corresponding signal sections being cut out of the original signal with the aid of a rectangular window. This procedure can result in so-called block effects occurring in the reconstruction. This can be overcome by using window functions with soft boundaries here. If window functions are intended to be used, then the range blocks must overlap.

There are two different options for using window functions.

a) Window functions with soft boundaries just for reconstruction

The window functions are used just for reconstruction. That is say rectangular window functions are still used in the transmitter to define the optimum domain blocks. However, the range blocks must overlap in accordance with the window function with soft boundaries used in the receiver. The domain blocks are also still cut out of the original signal with the aid of rectangular windows. Window functions with soft boundaries are used only for reconstruction in the receiver, in order that adjacent range blocks merge softly into one another. The overlap must be selected such that those edge areas of the range blocks overlap which are weighted by the window function with values not equal to unity. The window functions which are used for reconstruction must add up to unity in the overlapping area, for the overlapping addition of adjacent range blocks for signal reconstruction. Range block overlap levels of, for example, 0% to 50% are expediently used.

b) Window functions with soft boundaries in the transmitter and in the receiver

In addition to case a), window functions with soft boundaries can also be used in the search for the fractal code in the transmitter. The window function used here may have a function profile which differs from that of the window function used for reconstruction in the receiver. The window functions used in the transmitter also do not to include the limitation quoted in a), that is to say add up to unity in the overlap area. The window function may be selected on the basis of expediency so that, for example, the reproduction quality produced when using fractal coding is particularly good.

BRIEF DESCRIPTION OF THE DRAWING

The following figures illustrate schematic examples of window functions which may be used.

DESCRIPTION OF THE PREFERRED EMBODIMENTS

Figure 1:
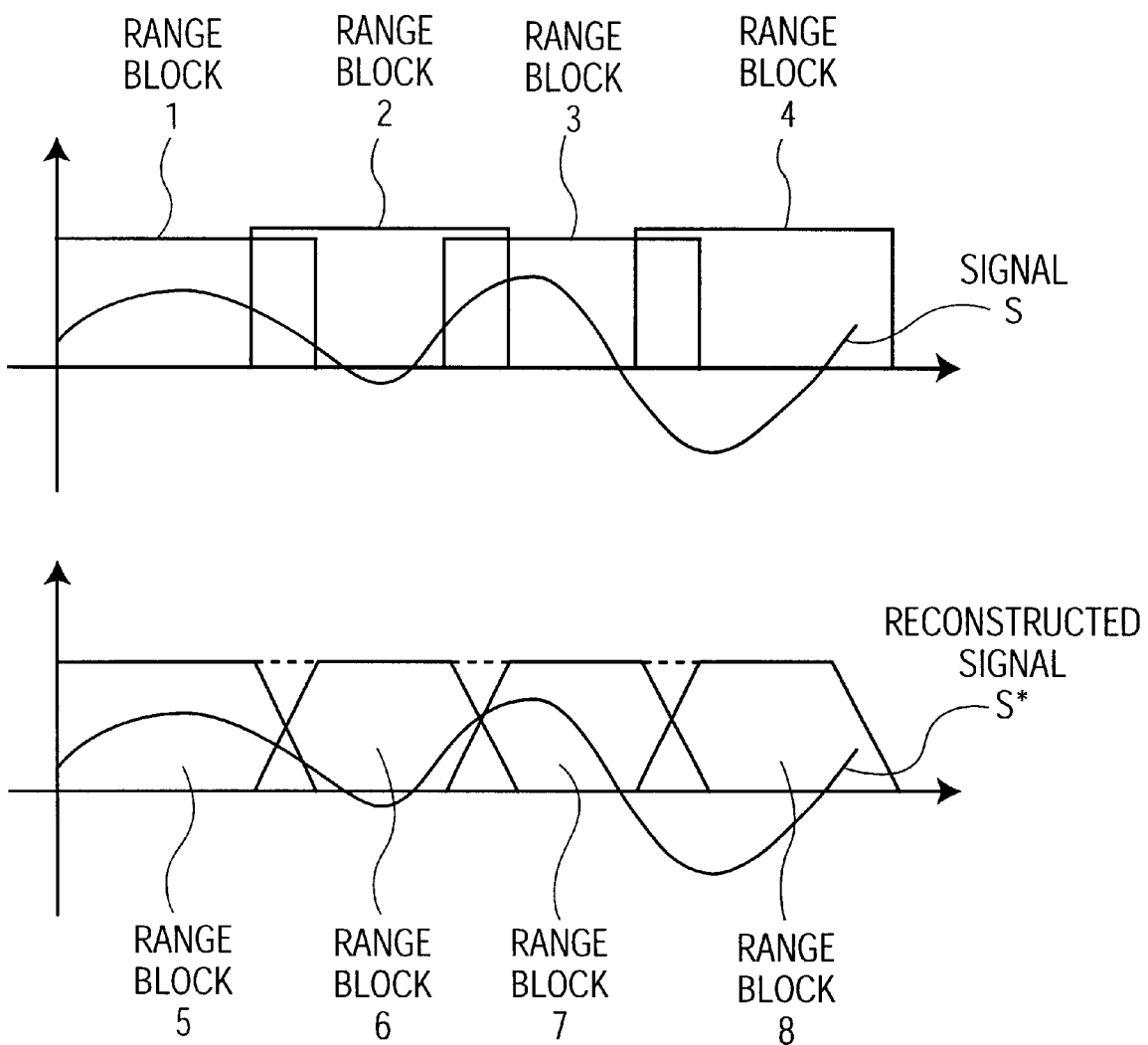
FIG. 1 shows schematically the position of the window functions in the transmitter and receiver in case a, and FIG. 2 shows schematically the position of the window functions in the transmitter and receiver in case b.

FIG. 1 shows the case a in which no windowing is used at the transmitter end (upper half of FIG. 1), and window functions are used only at the receiver end (lower half of FIG. 1) and have to be complemented in the overlapping region to form "1". The upper half of FIG. 1 shows a signal S which is split by square-wave functions into range blocks 1, 2, 3 and 4, which overlap one another. The lower half of FIG. 1 illustrates the reconstructed signal S* as well as the range blocks 5, 6, 7 and 8 with corresponding window functions, which add up to "1" in the overlapping region.

Figure 2:
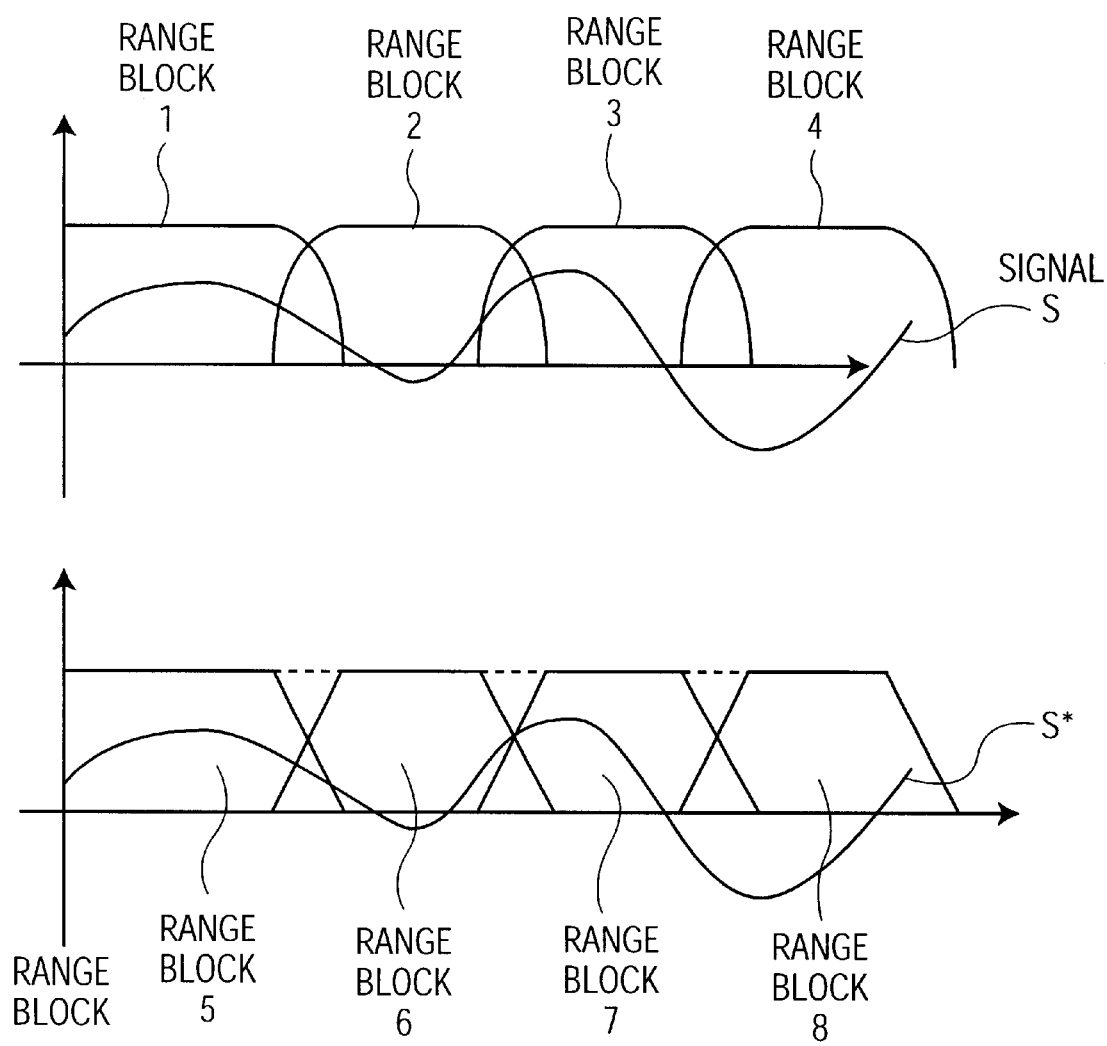

FIG. 2 shows schematically the case b, in which, the upper half of FIG. 2 shows range blocks 1, 2, 3, and 4 at the transmitter end and with soft boundaries, of a function S to be transmitted, and the lower part of FIG. 2 shows the range blocks 5, 6, 7 and 8, which are provided in a corresponding manner with an overlapping window function with soft boundaries, for reconstruction of the signal S*.

Annex 1: Derivation of equations (8) and (9)

It can be said that:

$$r^* = v \cdot d + b \qquad (a1)$$

where $$b = (b_1, b_2, \ldots, b_i, \ldots b_N)^T$$

and $$b_i = \sum_{m=1}^{M} a_m \cdot t_{i,m} \qquad (a2)$$

The mean square error is given by:

$$e^2 = 1/N \sum_{i=1}^{N} (r_i - r_i^*)^2 \qquad (a3)$$

$$= 1/N \sum_{i=1}^{N} \left( r_i - v \cdot d_i - \sum_{m=1}^{M} a_m \cdot t_{i,m} \right)^2$$

The optimum parameters v and $a_m$ are determined first of all by forming the partial derivative on the basis of one of the coefficients $a_k$, and equating this to zero. After differentiation and reorganization, this gives the following equation:

$$\sum_{i=1}^{N} r_i \cdot t_{i,k} - v \sum_{i=1}^{N} d_i \cdot t_{i,k} - \sum_{m=1}^{M} a_m \sum_{i=1}^{N} t_{i,m} \cdot t_{i,k} = 0 \qquad (a4)$$

With the aid of:

$$R_i = \sum_{i=1}^{N} r_i \cdot t_{i,k} \quad (k\text{-th spectral vector of } r) \qquad (a5)$$

$$D_k = \sum_{i=1}^{N} d_i \cdot t_{i,k} \quad (k\text{-th spectral vector of } d) \qquad (a6)$$

$$a_k = \sum_{m=0}^{M} a_m \sum_{i=1}^{N} t_{i,m} \cdot t_{i,k} \qquad (a7)$$

and the relationship:

$$\sum_{i=1}^{N} t_{i,m} \cdot t_{i,k} = \begin{cases} 1, \text{ for } m = k \\ 0, \text{ for } m \neq k \end{cases}$$

results, from (a4) in the equation (8)

$$a_k = R_k - v \cdot D_k \qquad (a9)$$

Using (a9), (a3) can be reorganized to give:

$$e^2 = 1/N \sum_{i=1}^{N} \left( r_i - \sum_{m=1}^{M} (R_m \cdot t_{i,m}) - v \cdot \left( d_i - \sum_{m=1}^{M} D_m \cdot t_{i,m} \right) \right)^2 \qquad (a10)$$

The complete reconstruction of each i-th element of the vector r is obtained from the weighted N basic vectors from:

$$r_i = \sum_{m=1}^{N} R_m \cdot t_{i,m} \qquad (a11)$$

The two identical terms in equation (a10) can thus be stated as:

$$R_i^* = r_i - \sum_{m=1}^{M} R_m \cdot t_{i,m} = \sum_{m=M+1}^{N} R_m \cdot t_{i,m} \qquad (a12)$$

and $$D_i^* = d_i - \sum_{m=1}^{M} D_m \cdot t_{i,m} = \sum_{m=M+1}^{N} D_m \cdot t_{i,m} \qquad (a13)$$

These are partial reconstructions of the vectors r and d from the weighted basic vector $t_m$ with the indices M+1 to N, given by their respective i-th elements. The mean square error can thus be stated as:

$$e^2 = 1/N \sum_{i=1}^{N} (R_i^* - v \cdot D_i^*)^2 \qquad (a14)$$

In order to determine v, the partial derivative of $e^2$ from equation (a14) is set to zero, resulting in the equation (8), namely:

$$v = \sum_{i=1}^{N} R_i^* \cdot D_i^* \bigg/ \sum_{i=1}^{N} (D_i^*)^2 \qquad (a15)$$

Annex 2: Example of a DCT transformation
The one-dimensional equation for DCT transformation is:

$$X(k) = (2/N)1/2 \cdot c(k) \sum_{m=0}^{N-1} x(m) \cos((2m+1)k\pi/2N) \qquad (a16)$$

where k=0, 1, ..., N−1, in which case x(m) are the input vector components and X(k) are the resultant output vector components of a corresponding vector block with N components.

What is claimed is:

1. Method for fractal coding of signals, in which a domain block d is investigated for a range block r to be transmitted from an original signal, so that, after using the calculation rule r*=v·d+b, an approximated range block r* is generated, v being an amplification factor and b being an offset vector, the offset vector b in general has different components b=($b_1, b_2, \ldots, b_n$), wherein the offset vector b is composed of weighted orthogonal basic functions tm of an orthogonal transformation, and wherein the mean square error $e^2$ is used to determine the optimum domain block d, in which case the optimum values for the amplification factor v and the coefficients $a_m$ of the orthogonal basis vectors $t_m$ become:

$$v = \sum_{i=1}^{N} R_i^* \cdot D_i^* \bigg/ \sum_{i=1}^{N} (D_i^*)^2$$

and $$a_m = R_m - v \cdot D_m$$

where:

$$b_i = \sum_{m=1}^{M} a_m t_{i,m} \text{ with}$$

$b_i$: i-th element of the vector $b$ with $N$ values, $t_{i,m}$: i-th element of the basis vector $t_m$ with $N$ values, $a_m$: weighting factor of the m-th basis vector $t_m$.

and $$R_i^* = \sum_{k=M+1}^{N} R_k \cdot t_{k,i},$$

$$R_k = \sum_{i=1}^{N} r_i \cdot t_{k,i} \text{ or } R_m = \sum_{i=1}^{N} r_i \cdot t_{m,i},$$

$$D_i^* = \sum_{k=M+1}^{N} D_k \cdot t_{k,i}, \text{ and}$$

$$D_k = \sum_{i=1}^{N} d_i \cdot t_{k,i} \text{ or } D_m = \sum_{i=1}^{N} d_i \cdot t_{m,i}.$$

2. Method according to claim 1, wherein the orthogonal transformation is the discrete cosine transformation DCT.

3. Method according to claim 2, wherein range block overlap levels of between 0 and 50% are used.

4. Method according to claim 1, wherein the range blocks (1, 2, 3, 4) to be transmitted overlap in the transmitter and are used in the receiver to reconstruct window functions (5, 6, 7, 8) with monotone rising and monotone falling boundaries.

5. Method according to claim 4, wherein at the transmitter end, the overlapping range blocks are weighted by window functions with monotone rising and monotone falling boundaries.

6. Method according to claim 1, wherein the window functions in the overlapping area of adjacent range blocks have values of less than 1.

7. Method according to claim 1, wherein the window functions in the overlapping area of adjacent range blocks complement one another in the signal reconstruction to form a weighting value of unity 1.

* * * * *